(12) United States Patent
Okeson et al.

(10) Patent No.: US 10,487,930 B2
(45) Date of Patent: Nov. 26, 2019

(54) DRIVE CLUTCH A CVT

(71) Applicant: TEAM Industries, Inc., Bagley, MN (US)

(72) Inventors: Shane Okeson, Bagley, MN (US); Brian G. Eck, Bemidji, MN (US); Christopher David Hamm, Solway, MN (US); Theodore Robert Otto, Brainerd, MN (US); Canaan Wray Ricke, Mahnomen, MN (US); Brandon R. Bonham, Bemidji, MN (US); Michael William Carver, Puposky, MN (US)

(73) Assignee: TEAM Industries, Inc., Bagley, MN (US)

( * ) Notice: Subject to any disclaimer, the term of this patent is extended or adjusted under 35 U.S.C. 154(b) by 178 days.

(21) Appl. No.: 15/628,471

(22) Filed: Jun. 20, 2017

(65) Prior Publication Data

US 2018/0363748 A1 Dec. 20, 2018

(51) Int. Cl.
*F16H 37/08* (2006.01)
*F16H 61/664* (2006.01)
(Continued)

(52) U.S. Cl.
CPC ......... *F16H 37/0846* (2013.01); *F16H 15/52* (2013.01); *F16H 15/54* (2013.01);
(Continued)

(58) Field of Classification Search
CPC ............... F16H 37/084; F16H 37/0846; F16H 61/66245; F16H 55/563; F16H 15/52; F16H 15/54; F16H 61/6649
See application file for complete search history.

(56) References Cited

U.S. PATENT DOCUMENTS 3,287,987 A 11/1966 Getz et al.
4,310,322 A 1/1982 Beck
(Continued)

FOREIGN PATENT DOCUMENTS

EP 1630455 3/2006
GB 1146323 3/1969
(Continued)

OTHER PUBLICATIONS

International Searching Authority, "International Search Report and the Written Opinion from PCT Application No. PCT/US2018/038442 dated Sep. 7, 2018", "from Foreign Counterpart of U.S. Appl. No. 15/628,471", dated Sep. 7, 2018, pp. 1-13, Published in: WO.

*Primary Examiner* — Justin Holmes
*Assistant Examiner* — Lillian T Nguyen
(74) *Attorney, Agent, or Firm* — Fogg & Powers LLC

(57) ABSTRACT

A drive clutch including a primary post, a fixed sheave, a movable sheave, an activation assembly is provided. The fixed sheave is statically coupled to the primary post. The movable sheave is slidably mounted on the primary post. The activation assembly is in operational communication with the movable sheave to move the movable sheave on the primary post away from and towards the fixed sheave based on a centrifugal force experienced by the drive clutch. The activation assembly includes a spider, at least one trunnion slidably mounted on a spider arm and a main activation biasing member. The at least one trunnion has opposable extending trunnion arms. A roller is rotationally mounted on each trunnion arm. Each roller is positioned to engage a ramp profile associated with a sheave post extending from the movable sheave. The main activation biasing member is positioned to assert a biasing force on the spider.

20 Claims, 13 Drawing Sheets

(51) Int. Cl.
*F16H 15/54* (2006.01)
*F16H 15/52* (2006.01)
*F16H 61/662* (2006.01)
*F16H 55/56* (2006.01)

(52) U.S. Cl.
CPC ....... *F16H 55/563* (2013.01); *F16H 61/6649* (2013.01); *F16H 61/66245* (2013.01)

(56) References Cited

U.S. PATENT DOCUMENTS

| | | |
|---|---|---|
| 4,384,862 A | 5/1983 | Nakane |
| 5,209,703 A | 5/1993 | Mastine et al. |
| 5,529,544 A | 6/1996 | Berto |
| 5,647,810 A * | 7/1997 | Huddleston ........... F16C 13/006 192/105 CD |
| 9,518,641 B2 | 12/2016 | Mariotti et al. |
| 2010/0216556 A1 * | 8/2010 | Mondragon-Parra ........................ F16D 3/2055 464/111 |
| 2015/0367839 A1 | 12/2015 | Murata |

FOREIGN PATENT DOCUMENTS

| | | |
|---|---|---|
| GB | 2532756 | 6/2016 |
| JP | S6263258 A | 3/1987 |

\* cited by examiner

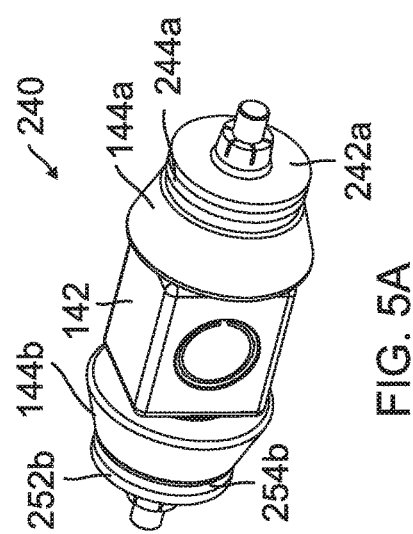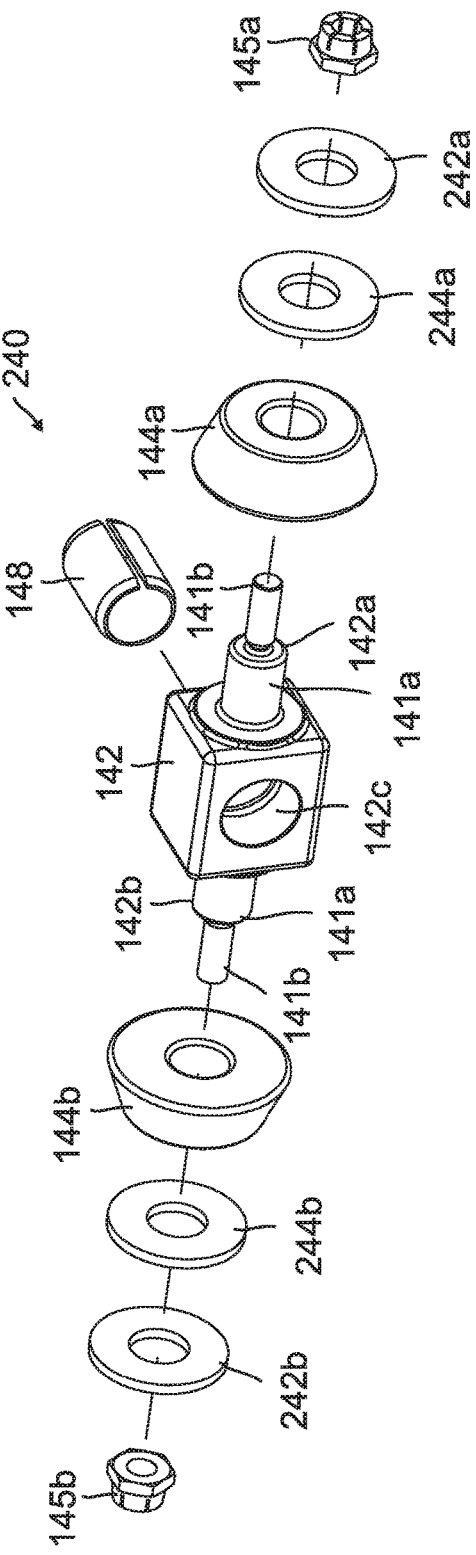
FIG. 5A
FIG. 5B

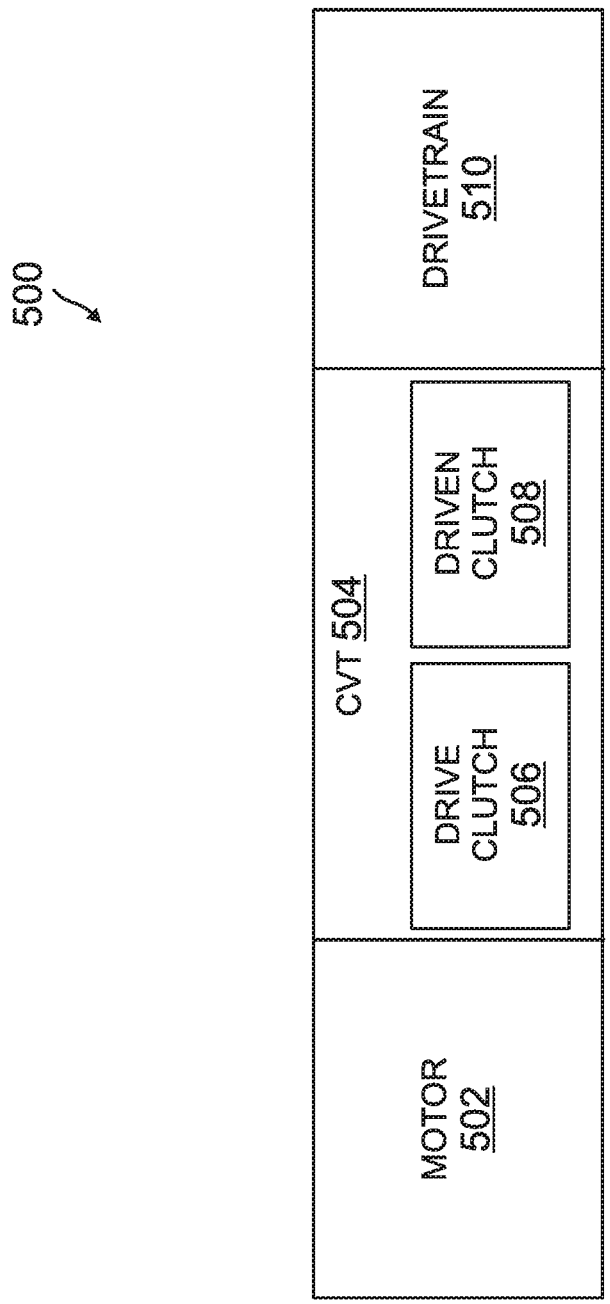

DRIVE CLUTCH A CVT

BACKGROUND

Continuously variable transmissions (CVTs) typically include a drive clutch and a driven clutch. The driven clutch is rotational communication with the drive clutch via belt. The drive clutch is typically in rotational communication with an engine to receive engine torque. With a drive clutch, as the rotational speed and centrifugal force increase and decrease, a movable sheave portion moves either away from or towards a fixed sheave portion. The belt, riding on faces of the fixed and movable sheave portions move either towards a central axis of the drive clutch or away from the central axis therein changing the gear ratio of the CVT.

SUMMARY

The present invention and will be understood by reading and studying the following specification. The following summary is made by way of example and not by way of limitation. It is merely provided to aid the reader in understanding some of the aspects the subject matter disclosed.

In one embodiment, a drive clutch for a continuously variable transmission is provided. The drive clutch includes a primary post, a fixed sheave, a movable sheave, an activation assembly. The primary post is configured to receive torque from a motor. The fixed sheave is statically coupled to the primary post. The movable sheave is slidably mounted on the primary post. The movable sheave has a first side positioned to face the fixed sheave and a second side. At least one sheave post extends from the second side of the movable sheave. The activation assembly is in operational communication with the movable sheave to move the movable sheave on the primary post away from and towards the fixed sheave based on a centrifugal force experienced by the drive clutch. The activation assembly includes a spider, at least one trunnion and a main activation biasing member. The spider includes at least one spider arm. The spider is generally locked to a rotation of the primary post. The at least one trunnion is slidably mounted on the at least one spider arm. The at least one trunnion has opposable extending trunnion arms. A roller is rotationally mounted on each trunnion arm. Each roller is positioned to engage a ramp profile associated with a sheave post of the at least one sheave post of the movable sheave. The main activation biasing member is positioned to assert a biasing force on the spider.

In another embodiment, a method of calibrating a drive clutch for a continuously variable transmission is provided. The method includes determining desired characteristics of the drive clutch based on an application for a select vehicle. At least one of a weight of at least one trunnion assembly and a ramp profile is changed to achieve the desired characteristics of the drive clutch. The at least one trunnion assembly includes opposably extending trunnion arms. Each trunnion arm has mounted thereon a roller configured to engage an associated ramp profile. The at least one trunnion is further slidably mounted on a spider arm of a spider of an activation assembly that is configured to move a movable sheave on a primary post away from and towards a fixed sheave based on a centrifugal force experienced by the drive clutch.

In still another embodiment, a vehicle is provided. The vehicle includes a motor, a continuously variable transmission and a drive train. The motor provides motor torque. The continuously variable transmission includes a drive clutch, a driven clutch and a belt. The drive clutch is in operational communication with the motor to receive the motor torque. The belt is in operation communication with the drive clutch and the driven clutch to pass torque from the drive clutch to the driven clutch. The drive clutch includes a primary post, a fixed sheave, a movable sheave and an activation assembly. The primary post is configured to receive the motor torque from the motor. The fixed sheave is statically coupled to the primary post. The movable sheave is slidably mounted on the primary post. The movable sheave has a first side positioned to face the fixed sheave and a second side. At least one sheave post extends from the second side of the movable sheave. The activation assembly is in operational communication with the movable sheave to move the movable sheave on the primary post away from and towards the fixed sheave based on a centrifugal force experienced by the drive clutch. The activation assembly includes a spider, at least one trunnion and a main activation biasing member. The spider includes at least one spider arm. The spider is generally locked to a rotation of the primary post. The at least one trunnion is slidably mounted on the at least one spider arm. The at least one trunnion has opposable extending trunnion arms. A roller is rotationally mounted on each trunnion arm. Each roller is positioned to engage a ramp profile associated with a sheave post of the at least one sheave post of the movable sheave. The main activation biasing member is positioned to assert a biasing force on the spider. The drive train is in operational communicational with the driven clutch.

BRIEF DESCRIPTION OF THE DRAWINGS

The embodiments can be more easily understood and further advantages and uses thereof will be more readily apparent, when considered in view of the detailed description and the following figures in which:

FIG. 5A is a side perspective view of a trunnion assembly of one exemplary embodiment;

FIG. 5B is an exploded side view of the trunnion assembly of FIG. 5A;

FIG. 13 is a block diagram of a vehicle of an exemplary embodiment.

In accordance with common practice, the various described features are not drawn to scale but are drawn to emphasize specific features relevant to the embodiments discussed. Reference characters denote like elements throughout Figures and text.

DETAILED DESCRIPTION

In the following detailed description, reference is made to the accompanying drawings, which form a part hereof, and in which is shown by way of illustration specific embodiments which may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a drive clutch for a continuous variable transmission (CVT) that can be calibrated as needed for a specific application. A typical drive clutch is selected for its performance related for a specific application. As discussed, embodiments allow for calibration adjustments so that one drive clutch can be used for many different applications. The style of clutch described herein combines torque carrying features with belt clamp generating features using a rolling element to reduce friction, reduce components and to accomplish self-centering and self-aligning. This allows for equal load sharing between opposing torque carrying members. In embodiments described below, a trunnion and roller subassembly creates both a belt clamp force due to centrifugal forces against ramps and a torque that is carried through the ramps. The ramps are created from sheave posts having select ramp profiles that are attached to a movable sheave as discussed below. Opposing torque carrying members (which may include trunnion and roller subassemblies, sheave posts and ramp profiles and a spider) with variable geometry are used in embodiments to create application specific belt clamp characteristics.

Figure 1:
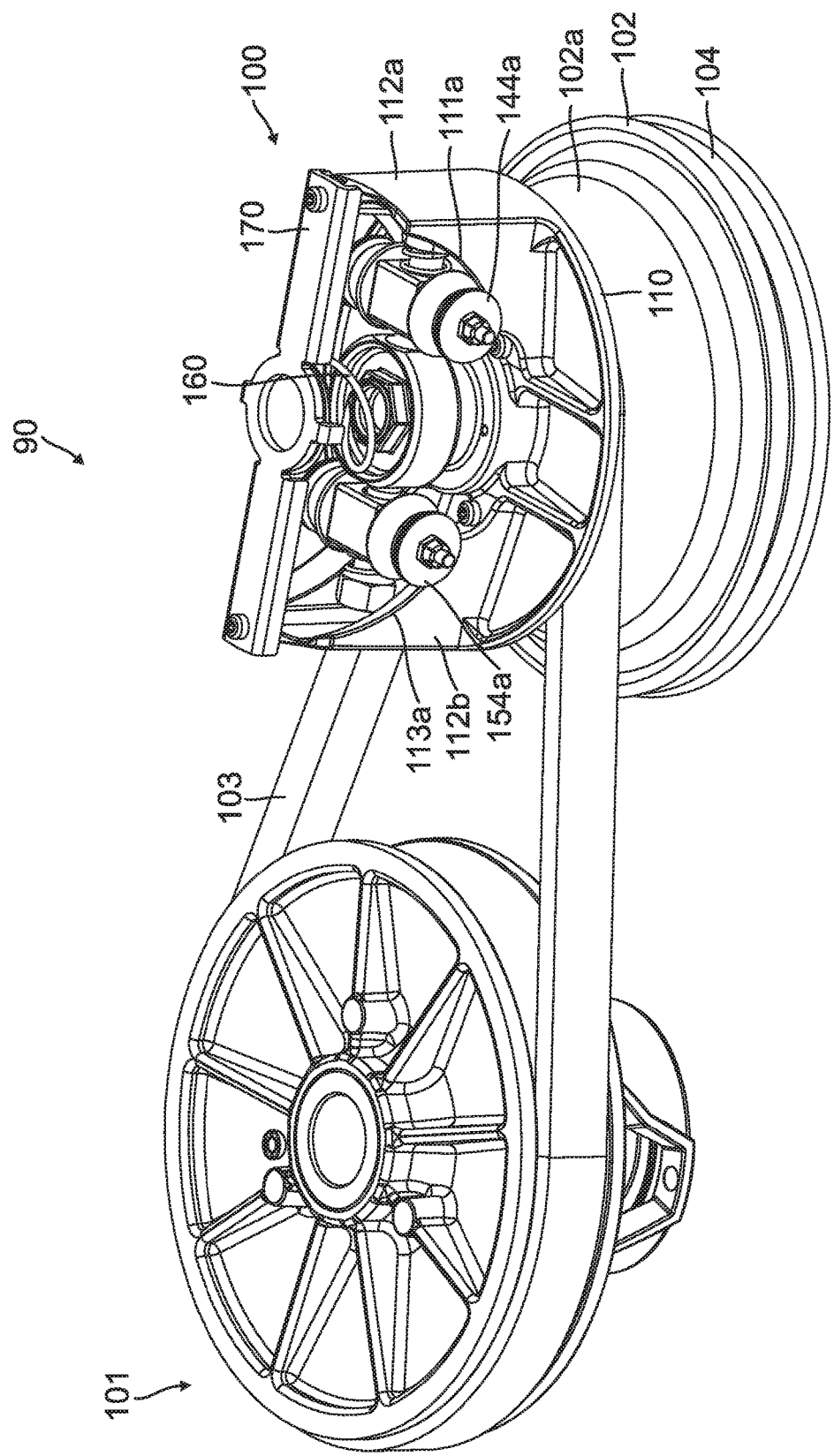
FIG. 1 is a continuous variable transmission (CVT) of one exemplary embodiment.
Figure 2:
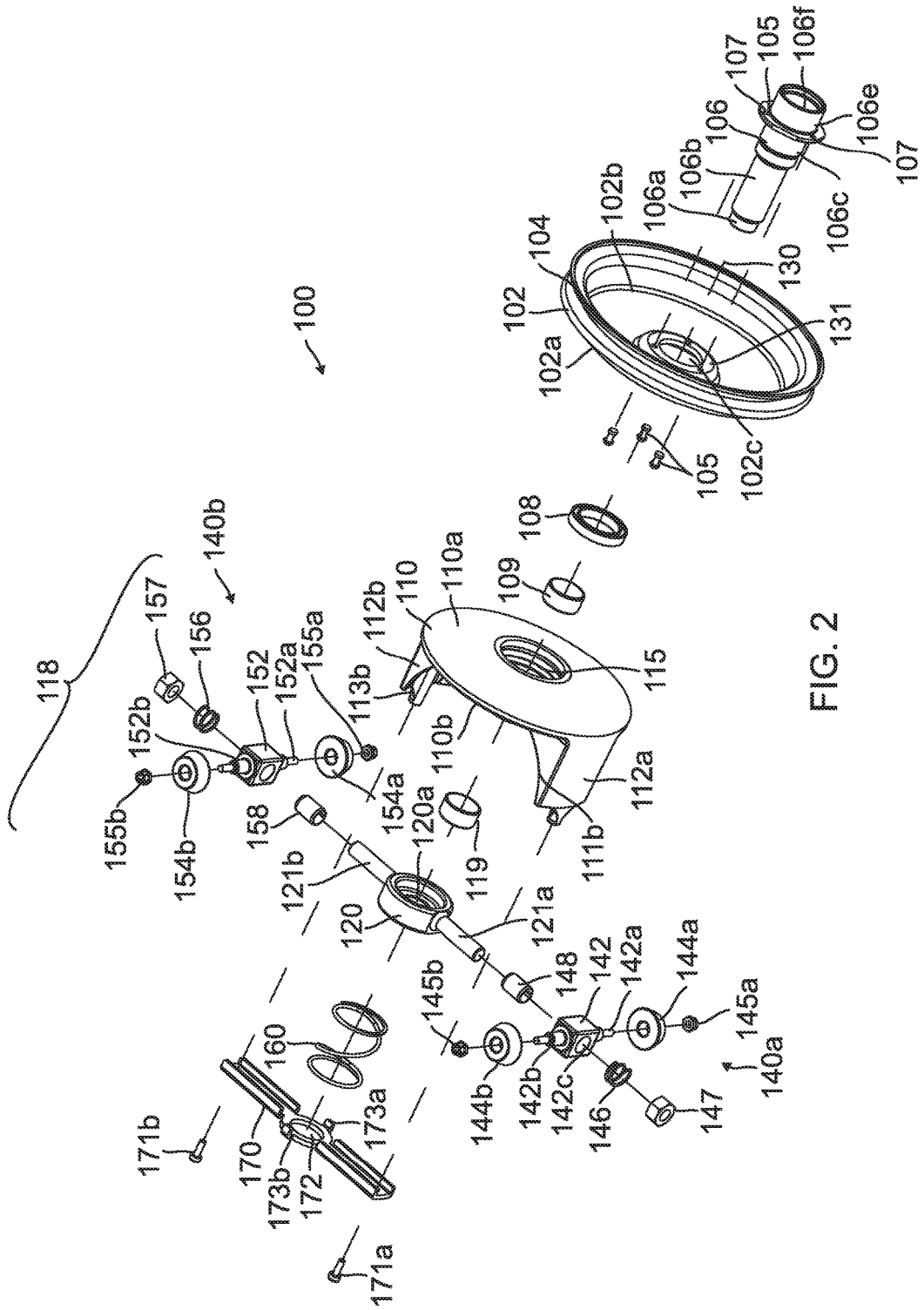
FIG. 2 is an exploded view of a drive clutch of the CVT of FIG. 1.

Referring to FIG. 1, a CVT 90 of one embodiment is illustrated. The CVT is illustrated as having a drive clutch 100, a driven clutch 101 and a belt 103 to transfer rotation from the drive clutch 100 to the driven clutch 101. The belt 103 refers to any kind of endless loop configuration used to transfer rotation. An exploded view of the drive clutch 100 is illustrated in FIG. 2. The drive clutch 100 includes a fixed sheave 102 and a movable sheave 110. The fixed sheave 102 is mounted on a primary post 106 via fasteners 105 in this embodiment. In particular, the fasteners 105 passing through sheave attaching apertures 131 of the fixed sheave 102 and post attaching apertures 107 on a flange 105 of the primary post 106 attaches fixed sheave 102 to the primary post 106. Different types of fasteners may be used in other embodiments. Moreover, in some embodiments fasteners are not used. The primary post 106 includes a first end portion 106a, a first mid-portion 106b, a second mid-portion 106c and a second end portion 106e. In the embodiment of FIG. 2, each portion may have a different diameter. A rotational torque of the engine or motor is received via power receiving passage 106f of the primary post 106. The power receiving passage 106f is located in an end of the second end portion 106e of the primary post 106.

Received on the primary post 106, proximate the fixed sheave 102, may be a sleeve bearing 108. Next to the sleeve bearing 108 is a plain bearing 109 that is also received around a portion of the primary post 106. In an embodiment, when the movable sheave 110 is positioned away from the fixed sheave 102, an inner surface of the belt 103 may engage on the sleeve bearing 108. The fixed sheave 102 includes a first side 102a and a second side 102b. The first side 102a, include a fixed sheave engaging face surface that is designed to engage a first side of the belt 103 to allow the belt 103 to ride up away from a central axis 130 of the drive clutch 100 or down towards the central axis 130 of the drive clutch 100 on the fixed engaging face surface as the movable sheave 110 moves towards or away from the fixed sheave 102. The fixed sheave 102 further includes a fixed sheave central passages 102c that receives the primary post 106. In one embodiment, the stationary sheave 102 includes a starter pulley 104 described in detail below. The starter pulley 104 is located about an outer perimeter of the stationary sheave 102.

Figure 3:
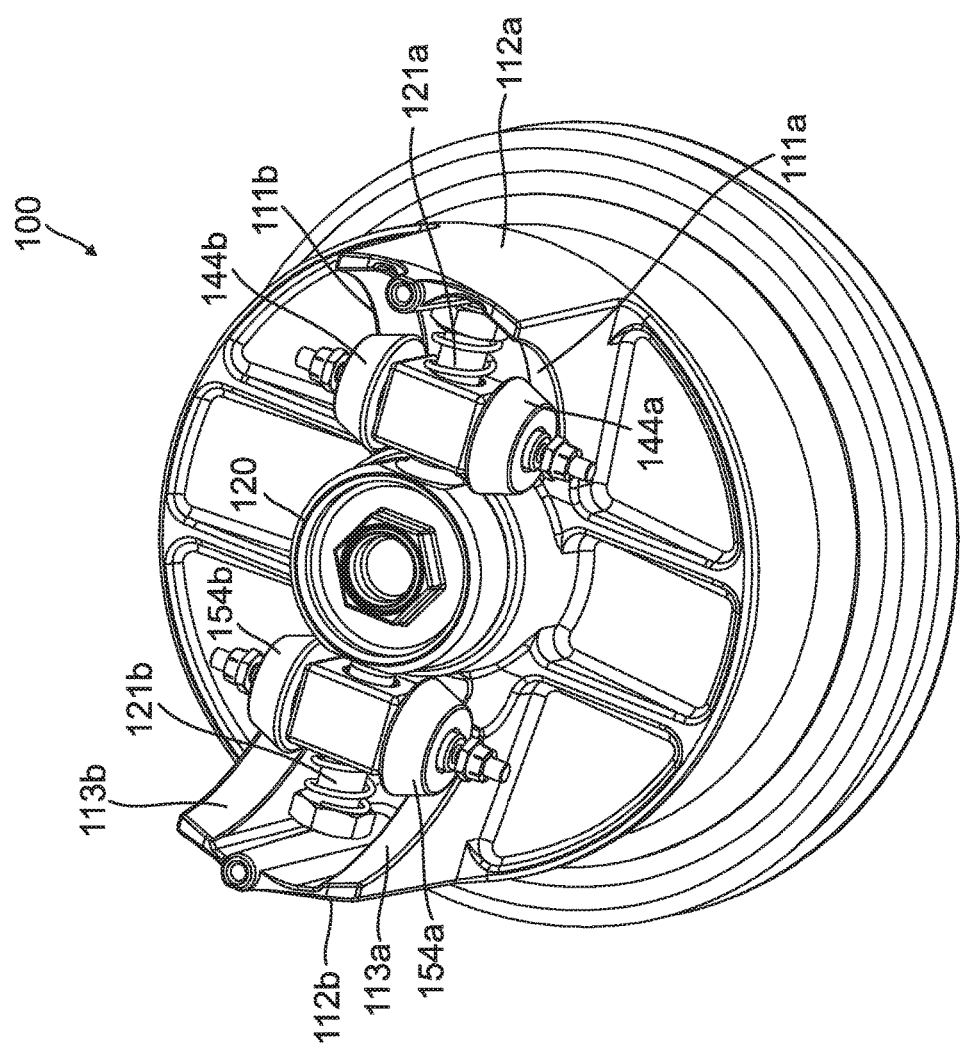
FIG. 3 is a side perspective view of the drive clutch of the CVT FIG. 1 illustrated without a cover.

The movable sheave 110 includes a first side 110a, a second side 110b and a movable sheave central passage 115. The movable sheave central passage 115 receives the plain bearing 109. The first side 110a of the movable sheave 110 includes a movable sheave engaging face surface designed to engage a second side of the belt 103 to allow the belt 103 to ride up away from a central axis 130 of the drive clutch 100 or down towards the central axis 130 of the drive clutch 100 on the movable engaging face surface as the movable sheave 110 moves towards or away from the fixed sheave 102. The fixed sheave engaging surface and the movable sheave engaging surface are both generally conical in shape to guide the belt 103 along the surfaces as the movable sheave 110 is moved in relation to the fixed sheave 102. Extending from the second side 110b of the movable sheave 110 is at least one sheave post with a ramp profile. In the embodiment of FIG. 1, two sheave posts, a first sheave post 112a and a second sheave post 112b are used. As best illustrated in FIG. 3, the first sheave post 112a and the second sheave post 112b in this embodiment includes two ramp profiles. In particular, sheave post 112a includes spaced ramp profiles 111a and 111b and sheave post 112b includes spaced ramp profiles 113a and 113b.

Moreover, the movable sheave 110 is designed to selectively axially slide along the first mid-portion 106b of the primary post 106 to change the distance between the fixed sheave 102 and the movable sheave 110. Embodiments employ an activation assembly 118 that engages the ramp profiles 111a, 111b, 113a and 113b of the sheave posts 112a and 112b to selectively axially move the movable sheave 110 in relation to the fixed sheave 102 on the primary post 106. The activation assembly 118 includes a spider 120 that has a central passage 120a and in this embodiment, a first arm 121a and a second arm 121b. The spider 120 is generally locked to the rotation of the primary post 106 in an embodiment. The activation assembly 118 further includes a first trunnion assembly 140a and second trunnion assembly 140b. The first trunnion assembly 140a is slidably received on the first arm 121a of the spider 120. The second trunnion assembly 140b is received on the second arm 121b of the spider 120.

The first trunnion assembly 140a includes a first trunnion base 142. The first trunnion base 142 includes a first trunnion arm 142a upon which a first roller 144a of the first trunnion assembly 140a is mounted and a second trunnion arm 142b upon which a second roller 144b of the first trunnion assembly 140a is mounted. A first fastening member 145a is coupled to a terminal end of the first trunnion arm 142a to retain the first roller 144a on the first trunnion arm 142a. A second fastening member 145b is coupled to a terminal end of the second trunnion arm 142b to retain the second roller 144b on the second trunnion arm 142b. The first trunnion base 142 further includes a passage 142c. The first spider arm 121a of the spider 120 is received within the passage 142c of the trunnion base 142 to slidably mount the first trunnion assembly 140b to the spider 120. A plain bearing 148 is positioned within the passage 142c of the trunnion base 142 and the first spider arm 121a of the spider 120. A third fastener 147 is coupled to a terminal end of the first spider arm 121a of the spider 120 to couple the first trunnion assembly 140a to the spider 120. A first trunnion biasing member 146 is positioned between the third fastener 147 and the first trunnion base 142 in an embodiment. The first trunnion biasing member 146 asserts a force on the first trunnion base 142 towards the central axis 130 in this embodiment.

The second trunnion assembly 140b includes a second trunnion base 152. The second trunnion base 152 includes a first trunnion arm 152a upon which a first roller 154a of the second trunnion assembly 140b is mounted and a second trunnion arm 152b upon which a second roller 154b of the second trunnion assembly 140b is mounted. A first fastening member 155a is coupled to a terminal end of the first trunnion arm 152a to retain the first roller 154a on the first trunnion arm 152a. A second fastening member 155b is coupled to a terminal end of the second trunnion arm 152b to retain the second roller 154b on the second trunnion arm 152b. The second trunnion base 152 further includes a passage 152c. The second arm 121b of the spider 120 is received within the passage 152c of the second trunnion base 152 to slidably mount the second trunnion assembly 140b to the spider 120. A plain bearing 158 is positioned within the passage 152c of the trunnion base 152 and the second spider arm 121b of the spider 120. A third fastener 157 is coupled to a terminal end of the second spider arm 121b of the spider 120 to couple the second trunnion assembly 140b to the spider 120. A second trunnion biasing member 156 is positioned between the third fastener 157 and the first trunnion base 152 in an embodiment. The second trunnion biasing member 156 asserts a force on the second trunnion base 152 towards the central axis 130 in this embodiment.

The activation assembly 118 further includes a main activation biasing member 160 and a cover 170. The cover 170 is coupled to the sheave posts 112a and 112b of the movable sheave 110 via fasteners 171a and 171b. The main activation biasing member 160 is positioned between the cover 170 and the spider 120 to assert a bias force that distances the cover 170 (which is attached to the movable sheave 110 via the sheave posts 112a and 112b) and the spider 120. The cover 170 in this embodiment includes a passage 172 that is aligned with the central passage 120a of the spider 120. Proximate the passage 172 are a pair of retaining tabs 173a and 173b used to retain the main activation biasing member 160 in a desired position in relation to the cover 170.

In operation, as the drive clutch 100 rotates faster the centrifugal force increases therein countering the biasing force of the main activation biasing member 160. Once enough centrifugal force is created, the main biasing member 160 compresses allowing the rollers 144a, 144b, 154a and 154b of the spider 102 to move up the respective ramp profiles 111a, 111b, 113a and 113b of the respective sheave posts 112a and 112b therein pushing the movable sheave 110 towards the fixed sheave 102. This moves the belt 103 farther away from the central axis 130. As the centrifugal force is lessened, the biasing force of the main biasing member 160 once again works to force the rollers 144a, 144b, 154a and 154b of the spider 102 down the respective ramp profiles 111a, 111b, 113a and 113b of the respective sheave posts 112a and 112b to move the movable sheave 110 away from the fixed sheave 102. This causes the belt 130 to move towards the central axis 130.

Figure 4A:
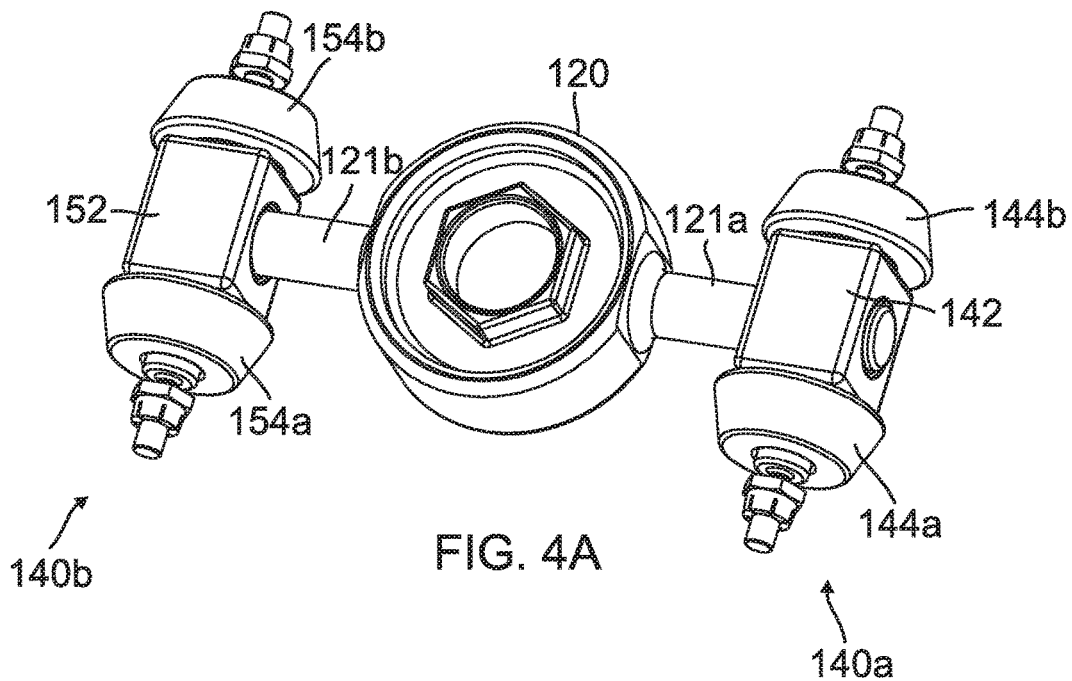
FIG. 4A is back perspective view of a trunnion/spider assembly of an activation assembly of an exemplary embodiment with the trunnions in a first position.
Figure 4B:
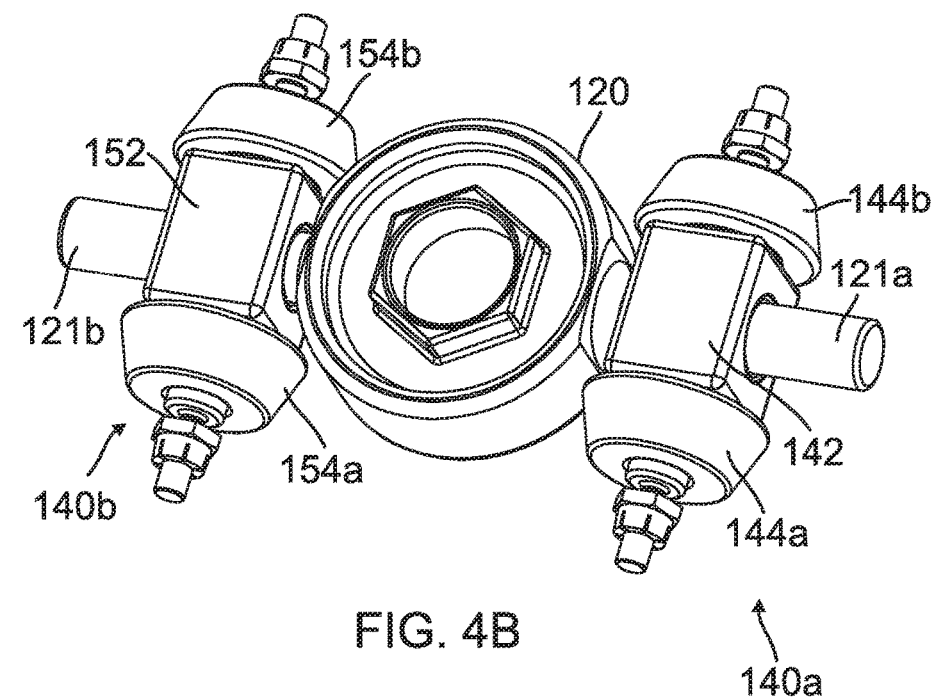
FIG. 4B is a back perspective view of the trunnion/spider assembly of the activation assembly of FIG. 4A with the trunnions in a second position.

Referring to FIGS. 4A and 4B, back perspective views of a trunnion/spider assembly of an activation assembly 118 of an embodiment are illustrated. The Figures illustrate how the trunnions 140a and 140b slide along the respective first and second spider arms 121a and 121b in an embodiment. As centrifugal force is increased the trunnions 140a and 140b move towards a respective terminal end of the first and second spider arms 121a and 121b. When the centrifugal force is lessened, the trunnions 140a and 140b move towards each other on the respective first and second spider arms 121a and 121b toward the central axis 130 of the drive clutch 100. FIG. 4A illustrates the trunnions 140a and 140b positioned proximate the respective terminal ends of the first and second spider arms 121a and 121b. FIG. 4B illustrates the trunnions 140a and 140b positioned proximate a hub of the spider 120.

Another feature of the trunnion/spider assembly/ramp profile of the activation assembly 118 of the drive clutch 100 is that various components can be changed/added to change the calibration of the drive clutch 100. Hence with embodiments, only one drive clutch 100 is needed for different applications by simply swapping out parts or by modification as discussed below. Referring to FIGS. 5A and 5B, an example embodiment of a trunnion assembly 240 of an embodiment is illustrated. In particular, FIG. 5A illustrates an assembled trunnion assembly 240 and FIG. 5B illustrates an exploded view of the trunnion assembly 240. The trunnion assembly 240 includes a trunnion base 142 with a passage 142c. Within the passage is a plain bearing 148 that allows the trunnion assembly 240 to slide on an arm of the spider. As discussed above, extending opposably from opposite surfaces of the trunnion base 142 is a first trunnion arm 142a and a second trunnion arm 142b. Each arm 142a and 142b includes a first portion 141a and second portion 141b. The first portion 141a extends from the trunnion base 142 and the second portion 141b extends from the first portion 141a. In this example embodiment, the first portion 141a has a larger diameter than the second portion 141b. The rollers 144a and 144b are mounted on the respective first portions 141a of the respective first and second trunnion arms 142a and 142b.

The total mass of the trunnion assembly 240 (including the trunnion base 142 and rollers 144a and 144b) create a shift force of the drive clutch. In this example embodiment, weight can be added or taken away from the trunnion assembly 240 to achieve a desired shift force characteristic of the drive clutch 100 via changing different weighted rollers 144*a* and 114*b* and/or adding weights, such as washers 242*a*, 244*b*, 242*n* and 244*b*. The rollers 144*a* and 144*b* in an embodiment are weighted angled rollers that can be easily changed for adjustment in mass to adjust the shift force. Removable fastener 145*a* and 145*b* are used to respectfully retain the rollers 144*a* and 144*b* and weights 242*a*, 244*a*, 242*b* and 244*b* on the respective first and second trunnion arms 142*a* and 142*b* in this example embodiment. The fasteners 145*a* and 145*b* are, in one embodiment, nuts that engage external threads (not shown) on the second portion 141*b* of the respective first and second trunnion arms 142*a* and 142*b* to selectively respectfully retain the rollers 144*a* and 144*b* and weights 242*a*, 244*a*, 242*b* and 244*b* on the respective first and second trunnion arms 142*a* and 142*b* of the trunnion assembly. Besides changing the weight of the rollers used, variations in widths and diameter and other geometry of the rollers can also be implemented to achieve desired characteristics of the drive clutch.

Figure 6A:
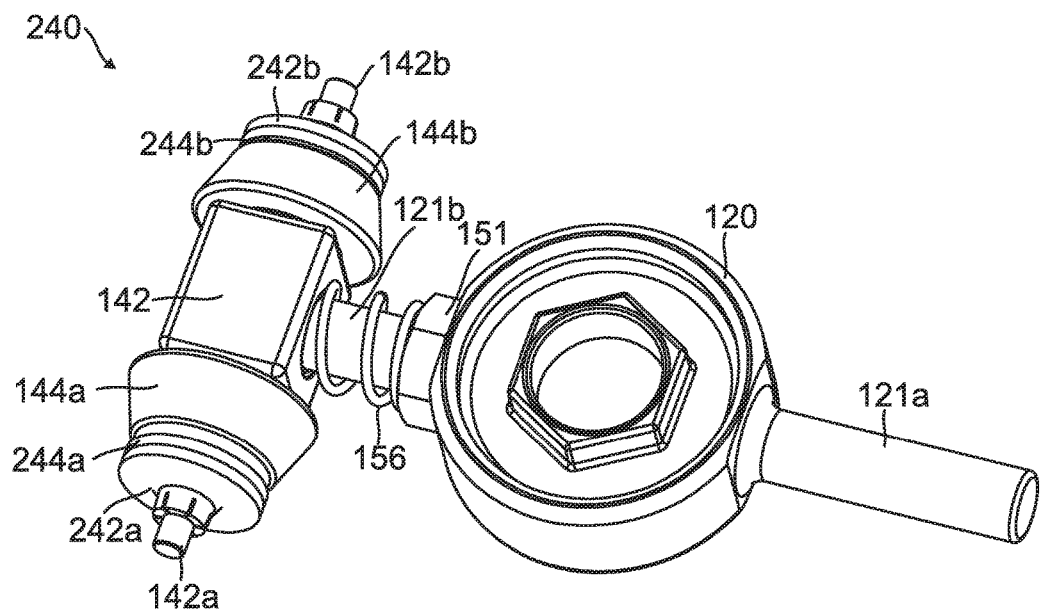
FIG. 6A is a partial back perspective view of a trunnion/spider assembly of one exemplary embodiment with a trunnion bias member in a first position.
Figure 6B:
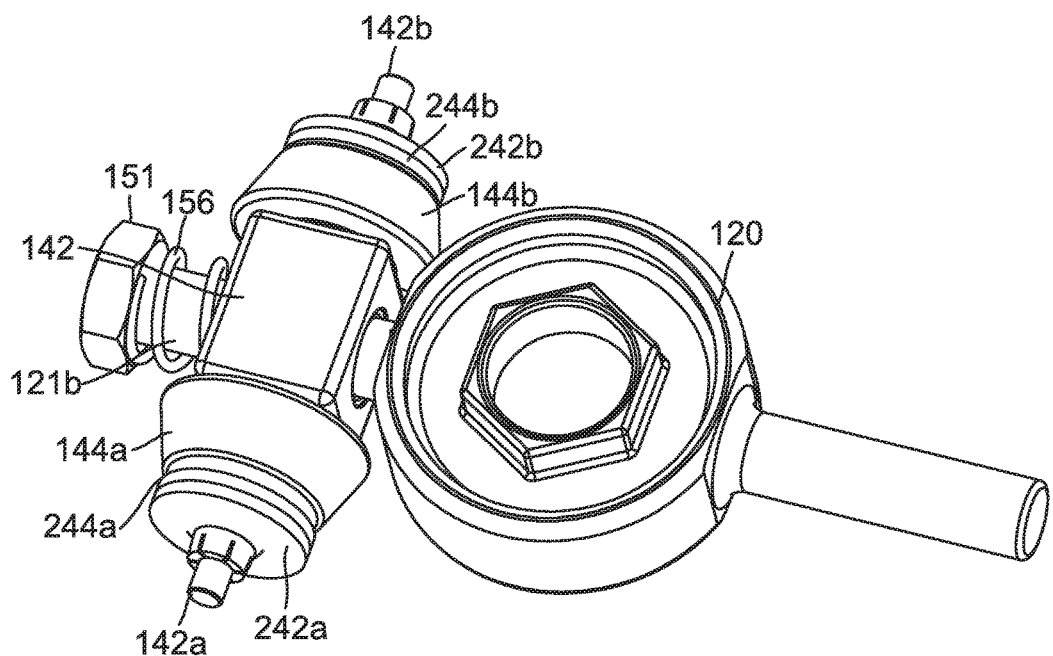
FIG. 6B is a partial back perspective view of the trunnion/spider assembly of FIG. 6A with the trunnion bias member in a second position.

Referring to FIGS. 6A and 6B further features of the trunnion/spider assembly in an embodiment is illustrated. In particular, FIGS. 6A and 6B illustrate trunnion assembly 240 mounted on the second spider arm 121*b* of spider 120. In particular FIG. 6A illustrates an embodiment with the trunnion biasing member 156 positioned to assert a bias force towards the terminal end of the second spider arm 121*b*. FIG. 6B illustrates the trunnion biasing member 156 positioned to assert a bias force on the trunnion 240 towards a hub of the spider 120 (or towards the central axis). Hence, by using a bias member 156, the reaction of the trunnion assembly 240 on a spider arm as a result of the centrifugal force can be changed. Moreover, by selectively positioning the bias member 156, the direction of the bias force can be directed to achieve a desired characteristic of the drive clutch 100. Moreover, embodiment may employ an adjustable bias force member to increase or decrease the bias force created by the bias member. For example, as illustrated in FIGS. 6A and 6B and adjustment nut 151 that is threadably engaged with the spider arm 121*b* and abutting an end of the bias member can be manually turned to adjust the bias force asserted on the trunnion 240. This adjustment can be done without disassembling the drive clutch.

Figure 7A:
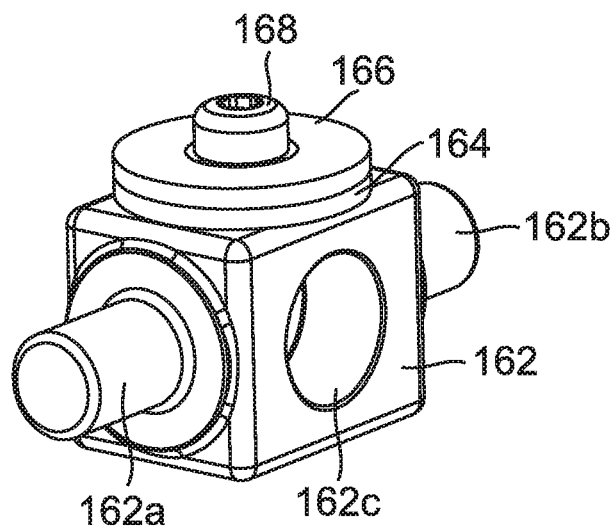
FIG. 7A illustrates a side perspective view of a trunnion body of an exemplary embodiment.
Figure 7B:
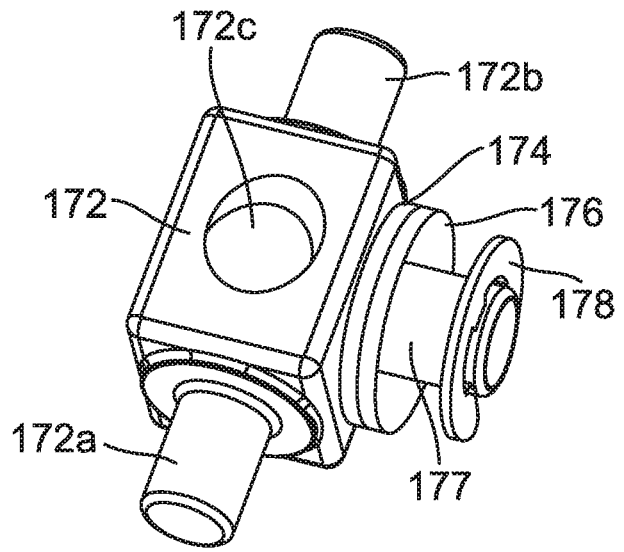
FIG. 7B illustrates a side perspective view of a trunnion body of another exemplary embodiment.

FIG. 7A illustrates a trunnion body 162 of one embodiment. In this embodiment, first and second trunnion arms 162*a* and 162*b* extend out from opposite sides of the trunnion body 162. The trunnion arms 162*a* and 162*b* receive rollers as discussed above. The trunnion body 162 includes a passage to receive a spider arm. In this embodiment, weights, such as washers 164 and 166, are coupled to a side of trunnion body 162 via fastener 168 to change the operating characteristic of the activation assembly. In this example, the weights 166 and 164 are attached to a surface of the trunnion body 164 that is generally perpendicular to surfaces where the trunnion arms 162*a* and 162*b* extend from. FIG. 7B illustrates another trunnion body 172 having trunnion arms 172*a* and 172*b* and a passage 172*c*. In this embodiment, a trunnion attachment post 177 that extends from the surface of the trunnion body 172 is used to attach weights 174 and 176 to the trunnion body 172. A C-clip 178 arrangement is used to retain the weights on the trunnion attachment post 177 in this example embodiment. Hence, in embodiments, weights can be attached in different locations on the trunnion body 172 to obtain a desired characteristic of the activation assembly 118 of the drive clutch.

Figure 8A:
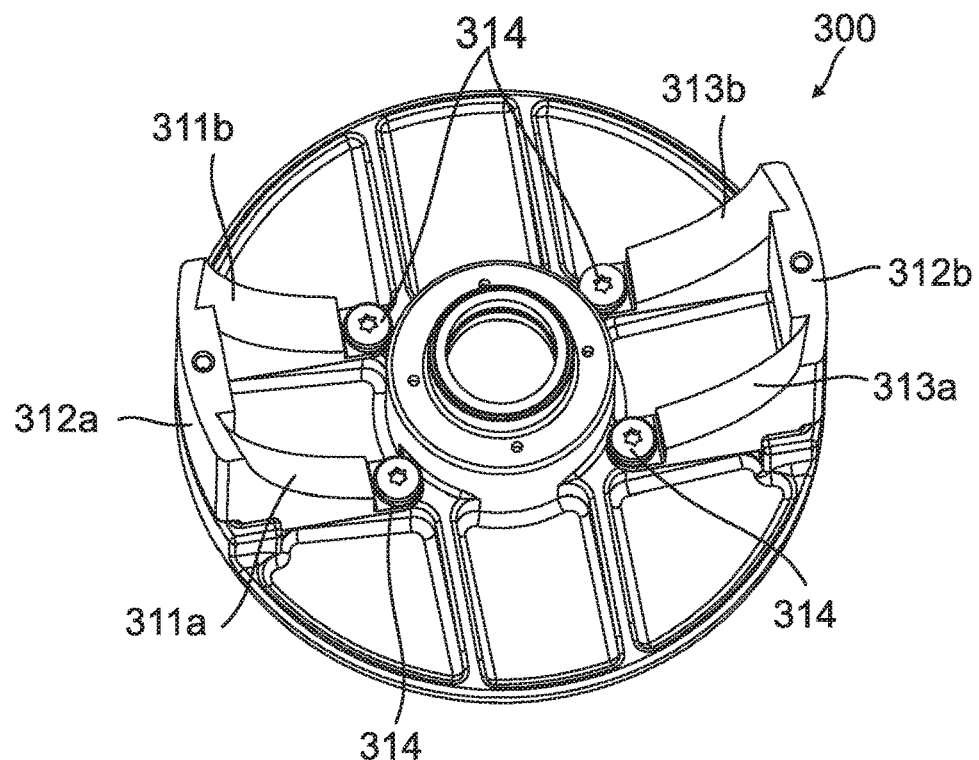
FIG. 8A, a back perspective view of a movable sheave of an exemplary embodiment with exchangeable sheave post.
Figure 8B:
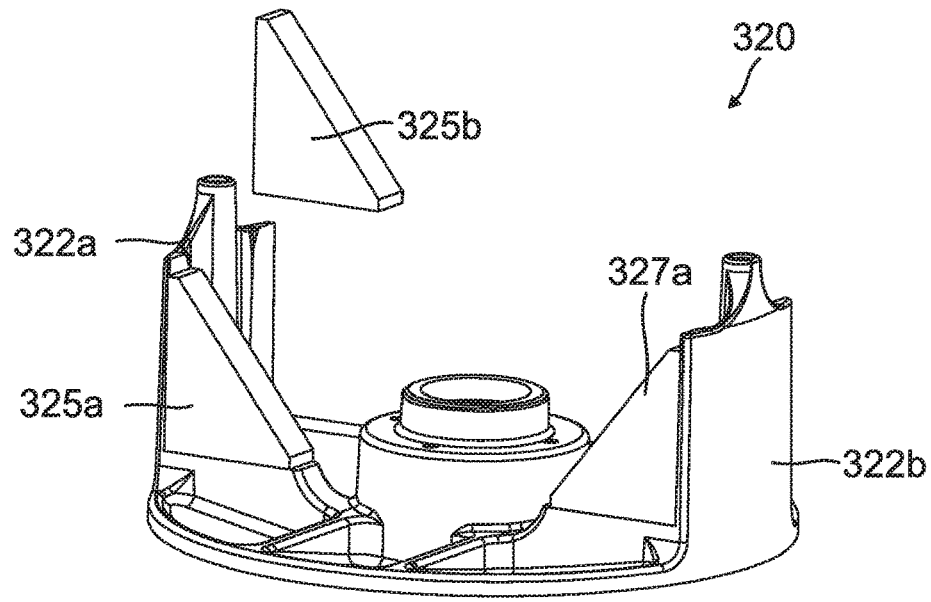
FIG. 8B, a side perspective view of a movable sheave of an exemplary embodiment with exchangeable ramp profile portions.

The characteristic of the activation assembly can also be changed by changing the ramp profiles on the sheave posts in embodiments. Referring to FIG. 8A, a movable sheave 300 of an embodiment is illustrated. The movable sheave 300 in this example embodiment include sheave posts 312*a* and 312*b* with respective ramp profiles 311*a*, 311*b*, 313*a* and 313*b* that are interchangeable. Hence in this embodiment, the whole sheave posts 312*a* and 312*b* are replaceable. Fasteners 314 selectively hold the sheave posts 312*a* and 312*b* in place. FIG. 8B, illustrates yet another embodiment where only inserts that contain ramp profile portions 325*a*, 325*b* and 327*a* (another ramp profile portion associated with a second sheave post 322*b* is not shown in FIG. 8B) are swapped out. Hence, the first sheave post 322*a* and the second sheave post 322*b* remain attached to the movable sheave 320. Fasteners may be used to attach the ramp profile portions 325*a*, 325*b* and 325*a* to the respective first sheave post 322*a* and second sheave post 322*b*. In one embodiment, a track connection system is implemented to attach the ramp profile portions 325*a*, 325*b* and 327*a* to the respective first sheave post 322*a* and second sheave post 322*b*.

Figure 9A:
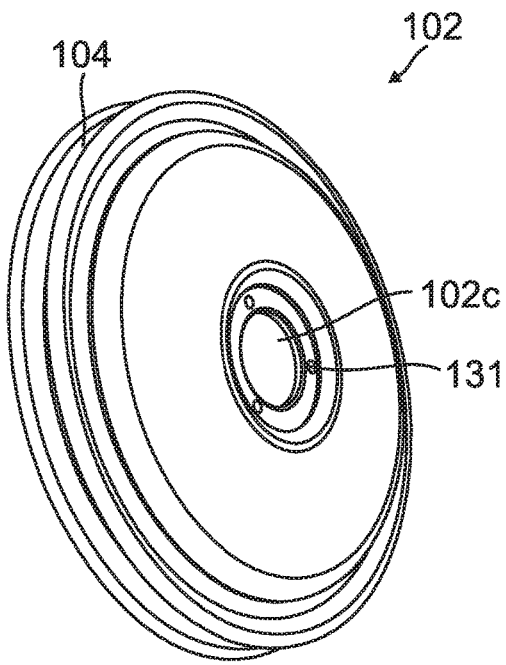
FIG. 9A is a back perspective view of a fixed sheave of an exemplary embodiment including a starter pulley.
Figure 9B:
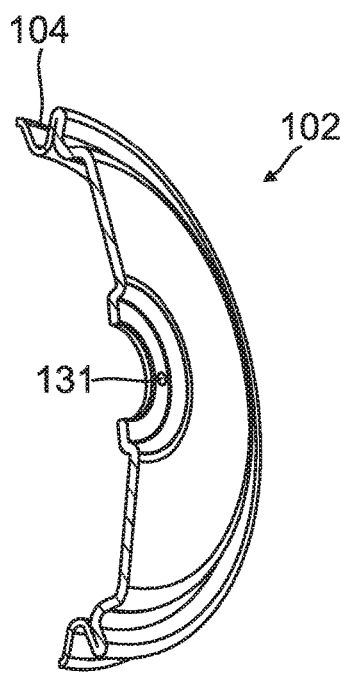
FIG. 9B is a cross-section back perspective view of the fixed sheave of FIG. 9A.

As briefly discussed above, the fixed sheave 102 in an embodiment includes a starter pulley 104 that is formed in a perimeter of the fixed sheave. FIG. 9A illustrates a back perspective view of the fixed sheave 102 of an exemplary embodiment and FIG. 9B illustrates a cross-section back perspective view of the fixed sheave 102 of FIG. 9A. The Figures illustrate the starter pulley 104. The combination fixed sheave/starter pulley is used in a vehicle that employs a pedal start application. The starter pulley 104 can be formed in the fixed sheave 102 using various different methods including, but not limited to, casting/machined, stamped/roll formed, etc.

Figure 10:
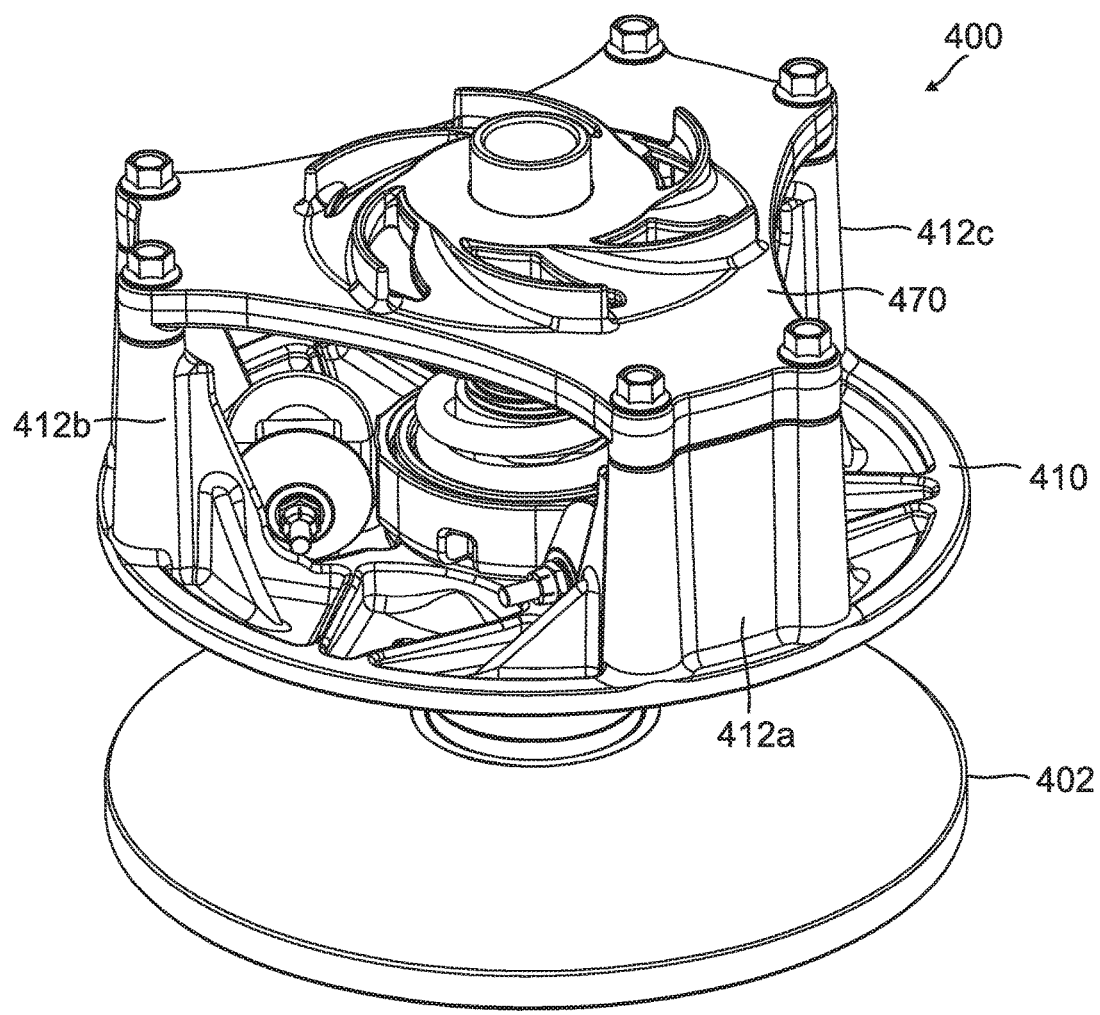
FIG. 10 is a side view of a drive clutch of another exemplary embodiment.
Figure 11:
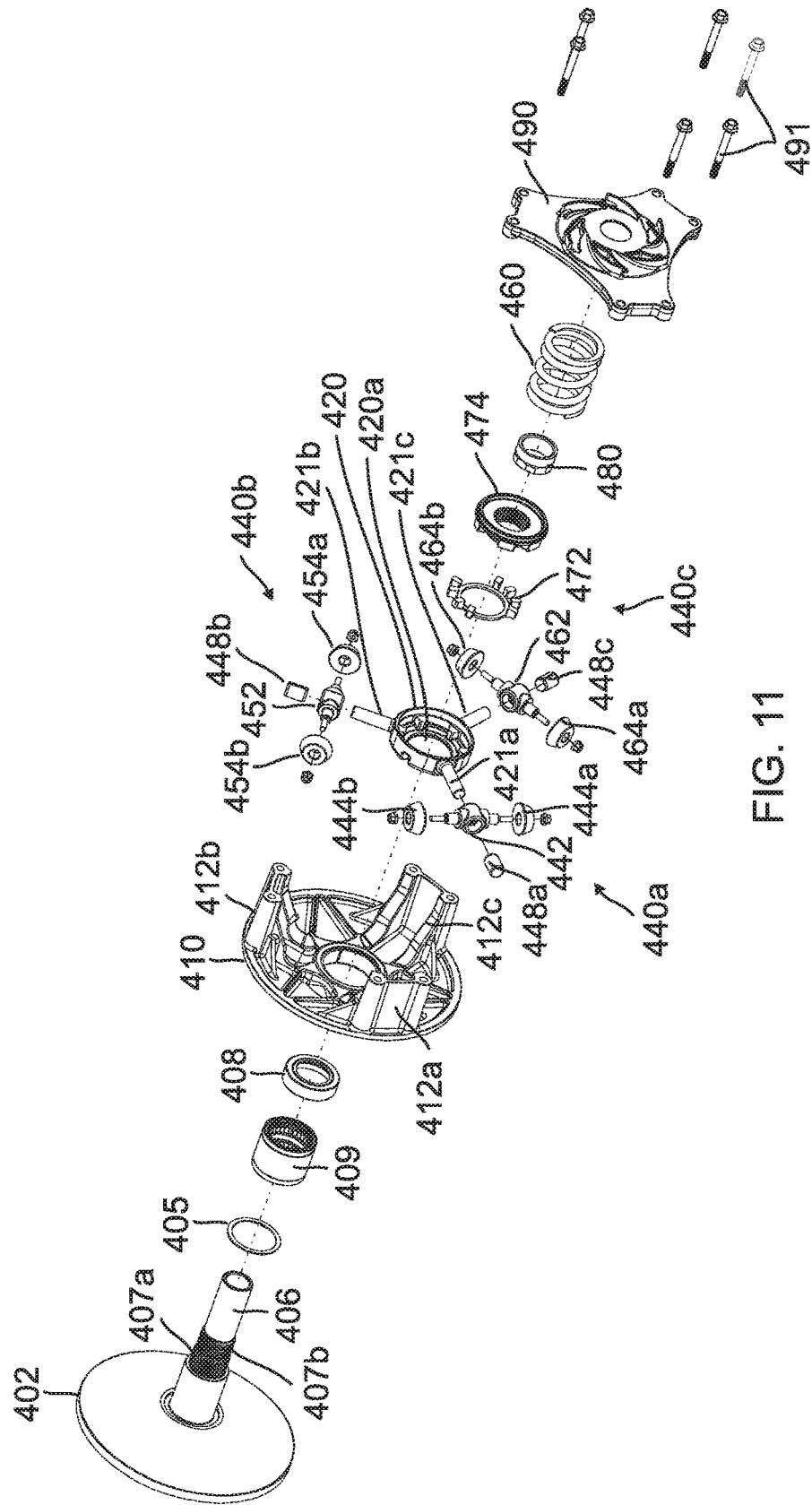
FIG. 11 is an exploded view of the drive clutch of FIG. 10.

The above embodiments illustrate an example drive clutch that implements a spider with two arms and movable sheave with two corresponding sheave posts with ramp profiles. However, any number of spider arms and associated sheave post can be used. For example, referring to FIG. 10, a drive clutch 400 of another exemplary embodiment is illustrated. Drive clutch 400 implements a spider 420 with three arms 421*a*, 421*b* and 421*c* and a movable sheave 410 with three sheave posts 412*a*, 412*b* and 412*c*. An exploded view of drive clutch 400 is illustrated in FIG. 11. As illustrated in FIG. 11, the drive clutch 400 includes a fixed sheave 402 that is fixed to a primary post 406. Received on the primary post 406 is a thrust washer 405, a needle bearing assembly 409 and a cap 408. The needle bearing 409 has an outer surface in which an inside surface of the belt 103 engages when the movable sheave 410 is positioned away from the fixed sheave 402.

As discussed above, the movable sheave 410 in this embodiment includes three sheave posts 412*a*, 412*b* and 412*c* with respective ramp profiles and a spider with three spider arms 421*a*, 421*b* and 421*c*. Mounted on the first spider arm 421*a* is a first trunnion assembly 440*a* that includes a trunnion body 442, a plain bearing 448*a* received in a passage of the trunnion body 442 and a pair of rollers 444*a* and 444*b* mounted on opposably positioned trunnion arms. Mounted on the second spider arm 421*b* is a second trunnion assembly 440*b* that includes a trunnion body 452, a plain bearing 448*b* received in a passage of the trunnion body 452 and a pair of rollers 454*a* and 454*b* mounted on opposably positioned trunnion arms. Mounted on the third spider arm 421*c* is a third trunnion assembly 440*c* that includes a trunnion body 462, a plain bearing 448*c* received in a passage of the trunnion body 462 and a pair of rollers 464*a* and 464*b* mounted on opposably positioned trunnion arms. Further a part of the activation system of this embodiment of the drive clutch includes a main activation biasing member 460 and a cover 490 that is coupled to the sheave posts 412*a*, 412*b* and 412*c* via fasteners 491. The drive clutch 400 is also illustrated as including jam nut 480 that is used to retain the spider 420 on the on the primary post 406. The drive clutch 400 further includes a torque damping assembly 470 that is designed to dampen engine pulses between a torque input and a torque output within the drive clutch 400.

Figure 12A:
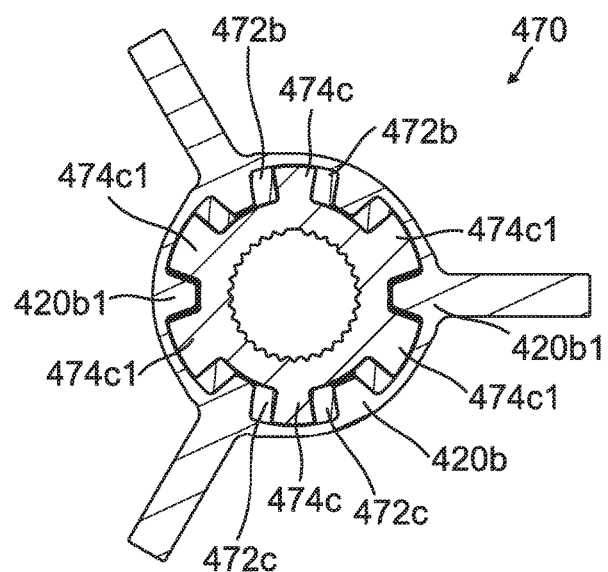
FIG. 12A is a cross-sectioned front view of an assembled torque dampening assembly of one exemplary embodiment.
Figure 12B:
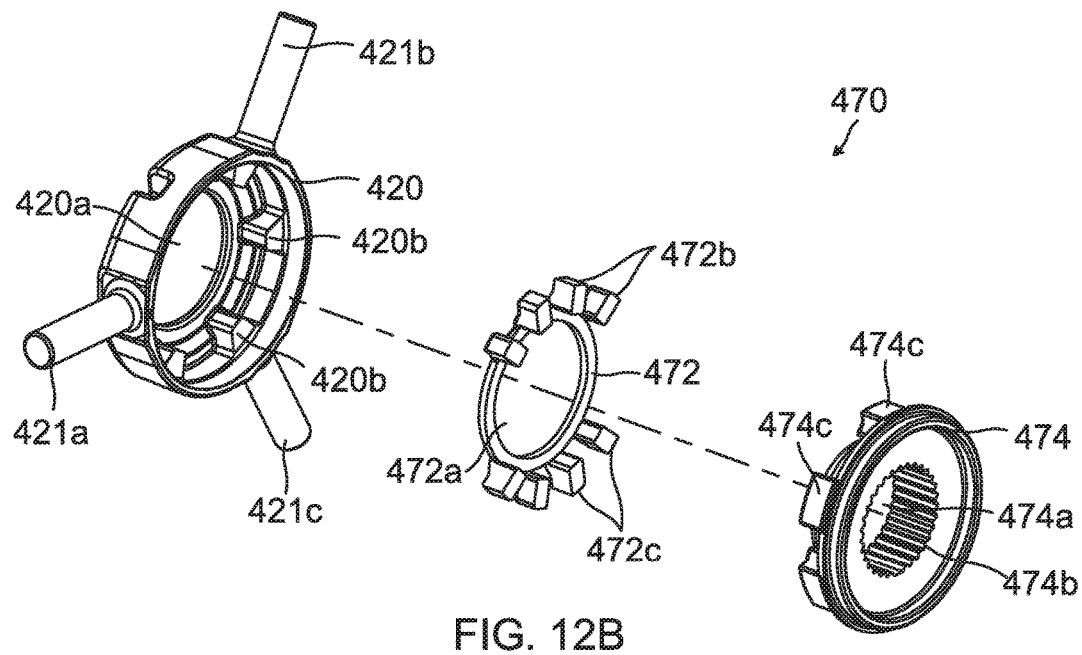
FIG. 12B is an exploded view of the torque dampening assembly of FIG. 12B.

The torque dampening assembly 470 is best illustrated in FIGS. 12A and 12B. The torque dampening assembly 470 includes inner extending spaced spider teeth 420b in an inner passage 420a of the spider 420. The torque dampening assembly 470 further includes a dampening member 472 and a torque transfer member 474. The torque dampening member 472, in this example embodiment, is generally ring shaped having a central passage 472a. Extending out from opposing sides of the torque dampening member 472 is a plurality of dampening tabs 472b and 472c. In an embodiment, at least the dampening tabs 472b and 472c of the toque dampening assembly 470 are made from an elastic material such as, but not limited to rubber, to absorb impacts. The torque transfer member 474 includes an internal passage 474a. Within the internal passage 474a are splines 474b that are designed to engage exterior splines 407 on the primary post 406 to lock rotation of the torque transfer member 474 with the primary post 406. The torque transfer member 474 include a plurality of torque transfer teeth 474c that are spaced proximate along an outer perimeter of the torque transfer member 474.

The torque dampening member 472 and the torque transfer member 474 are received within the inner passage 420a of the spider 420 as illustrated in FIG. 12A. As illustrated, the dampening tabs 472b and 472c of the of the torque dampening member 472 are positioned between at least some of the spider teeth 420b of the spider 420 and the torque transfer teeth 474c of the torque transfer member 474. In operation, torque from an engine or motor is provided to the primary post 406 of the drive clutch 400. Torque from the primary post 406 in turn is provided to the torque transfer member 474 via splines 474b. As the torque transfer member 474 rotates, the torque transfer teeth 474c engage adjacent dampening tabs 472b and 472c of the torque dampening member 472 which in turn engage the spider teeth 420b of the spider 420. The dampening tabs 472b and 472c absorb torque peaks due to engine pulses. The opposing pairs of the dampening tabs 472b and 472c of the torque dampening member 472 are additive in function until solid sections of the torque transfer teeth and spider teeth (designated as 472c1 and 420b1) of the respective torque transfer member 474 and the spider 420 come into contact, conveying the torque to the spider 420.

Embodiments of the drive clutches discussed above can be used in a variety of different types of vehicles implementing torque produced by an engine or motor. For example, FIG. 13 illustrates a 500 vehicle of an embodiment that implements a driven clutch as discussed above. The vehicle includes a motor or engine 502 that produces rotational torque. Examples of motor 502 include, but are not limited to, a combustion engine, an electrical motor etc. A CVT 504 is coupled to receive the rotational torque from the motor 502. The CVT includes a drive clutch 506 as discussed above and a driven clutch 508. The driven clutch 508 is in operational communication with a drivetrain 510 of the vehicle 500. The drivetrain 510 may include a transmission gear box, one or more drive shafts, one or more differentials, a transaxle, one or wheels, a track, etc. used to move the vehicle based on the torque generated from the motor 502.

Example Embodiments

Example 1 is a drive clutch for a continuously variable transmission. The drive clutch includes a primary post, a fixed sheave, a movable sheave, an activation assembly. The primary post is configured to receive torque from a motor. The fixed sheave is statically coupled to the primary post. The movable sheave is slidably mounted on the primary post. The movable sheave has a first side positioned to face the fixed sheave and a second side. At least one sheave post extends from the second side of the movable sheave. The activation assembly is in operational communication with the movable sheave to move the movable sheave on the primary post away from and towards the fixed sheave based on a centrifugal force experienced by the drive clutch. The activation assembly includes a spider, at least one trunnion and a main activation biasing member. The spider includes at least one spider arm. The spider is generally locked to a rotation of the primary post. The at least one trunnion is slidably mounted on the at least one spider arm. The at least one trunnion has opposable extending trunnion arms. A roller is rotationally mounted on each trunnion arm. Each roller is positioned to engage a ramp profile associated with a sheave post of the at least one sheave post of the movable sheave. The main activation biasing member is positioned to assert a biasing force on the spider.

Example 2, includes the drive clutch of Example 1, wherein each roller is selectively mounted on an associated trunnion arm so that the roller can be replaced with at least one of a different sized roller and a different weight roller.

Example 3 includes the drive clutch of any of the aspects of Examples 1-2, further including at least one trunnion biasing member positioned to assert a select biasing force on the at least one trunnion.

Example 4 includes the drive clutch aspects of Example 3, further including an adjustable bias force member configured to adjust the biasing force of each trunnion biasing member.

Example 5 includes the drive clutch aspects of any of the Examples 1-4, further including at least one weight selectively mounted on the at least one trunnion.

Example 6 includes the drive clutch aspects of Example 3, wherein each trunnion further includes a trunnion base. The opposable extending trunnion arms extends from the trunnion base. Moreover, the at least one weight is attached to a surface of the trunnion base.

Example 7 includes the drive clutch aspects of Example 3, wherein each trunnion further includes a trunnion base. The opposable extending trunnion arms extend from the trunnion base. The trunnion attachment post further extends from the trunnion base. The at least one weight is mounted on the trunnion attachment post.

Example 8 includes the drive clutch aspects of any of the Examples 1-7, wherein the ramp profile associated with the sheave post of the at least one sheave post of the movable sheave is interchangeable.

Example 9 includes the drive clutch aspects of any of the Examples 1-8, further including at least one fastener to selectively couple the at least one sheave post and associated ramp profile to the movable sheave.

Example 10 includes the drive clutch aspects of any of the Examples 1-9, wherein the fixed sheave further includes a starter pulley. The starter pulley is positioned approximate an outer perimeter of the fixed sheave.

Example 11 includes the drive clutch aspects of any of the Examples 1-10, further including a torque dampening assembly coupled between the spider and the primary post. The torque dampening assembly is configured to absorb unwanted torque peaks due to motor pulses.

Example 12 includes the drive clutch aspects of Example 11, wherein the torque dampening assembly further includes a torque dampening member and a torque transfer member. The torque dampening member includes a plurality of dampening tabs. The dampening tabs are made from an elastic material. The torque transfer member is locked to the rotation of the primary post. The torque transfer member includes a plurality of torque transfer teeth. The torque damping member and torque transfer member are received within a spider passage of the spider such that the plurality of dampening tabs of the torque dampening member are positioned between at least some of the plurality of torque transfer teeth of the torque transfer member and at least some of spaced spider teeth within the spider passage of the spider.

Example 13 is a method of calibrating a drive clutch for a continuously variable transmission. The method includes determining desired characteristics of the drive clutch based on an application for a select vehicle. At least one of a weight of at least one trunnion assembly and a ramp profile is changed to achieve the desired characteristics of the drive clutch. The at least one trunnion assembly includes opposably extending trunnion arms. Each trunnion arm has mounted thereon a roller configured to engage an associated ramp profile. The at least one trunnion is further slidably mounted on a spider arm of a spider of an activation assembly that is configured to move a movable sheave on a primary post away from and towards a fixed sheave based on a centrifugal force experienced by the drive clutch.

Example 14 is a method including the method of Example 13, wherein changing the at least one weight of the at least one trunnion assembly includes at least one of changing the least one roller and adding at least one weight to the trunnion assembly.

Example 15 is a method including aspects of any of the Examples 13-14, wherein changing the ramp profile includes at least one of changing out at least one sheave post attached to the movable sheave and changing out at least one ramp profile associated with the at least one sheave post.

Example 15 is a method including aspects of any of the Examples 13-15, further including applying bias force on the at least one trunnion.

Example 17 is a vehicle including a motor, a continuously variable transmission and a drive train. The motor provides motor torque. The continuously variable transmission includes a drive clutch, a driven clutch and a belt. The drive clutch is in operational communication with the motor to receive the motor torque. The belt is in operation communication with the drive clutch and the driven clutch to pass torque from the drive clutch to the driven clutch. The drive clutch includes a primary post, a fixed sheave, a movable sheave and an activation assembly. The primary post is configured to receive the motor torque from the motor. The fixed sheave is statically coupled to the primary post. The movable sheave is slidably mounted on the primary post. The movable sheave has a first side positioned to face the fixed sheave and a second side. At least one sheave post extends from the second side of the movable sheave. The activation assembly is in operational communication with the movable sheave to move the movable sheave on the primary post away from and towards the fixed sheave based on a centrifugal force experienced by the drive clutch. The activation assembly includes a spider, at least one trunnion and a main activation biasing member. The spider includes at least one spider arm. The spider is generally locked to a rotation of the primary post. The at least one trunnion is slidably mounted on the at least one spider arm. The at least one trunnion has opposable extending trunnion arms. A roller is rotationally mounted on each trunnion arm. Each roller is positioned to engage a ramp profile associated with a sheave post of the at least one sheave post of the movable sheave. The main activation biasing member is positioned to assert a biasing force on the spider. The drive train is in operational communicational with the driven clutch.

Example 18 is a vehicle including the aspects of Example 17, wherein the drive clutch further includes a trunnion biasing member positioned to assert a select biasing force on the at least one trunnion and an adjustable bias force member configured to adjust the biasing force on the at least one trunnion.

Example 19 is a vehicle including any of the aspects of Examples 17-18, wherein the drive clutch further comprises a torque dampening assembly coupled between the spider and the primary post. The torque dampening assembly is configured to absorb unwanted torque peaks due to motor pulses.

Example 20 is a vehicle including any of the aspects of Examples 17-19, wherein the fixed sheave of the drive clutch further includes a starter pulley, the starter pulley positioned approximate an outer perimeter of the fixed sheave.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A drive clutch for a continuously variable transmission, the drive clutch comprising:
   a primary post configured to receive torque from a motor;
   a fixed sheave statically coupled to the primary post;
   a movable sheave slidably mounted on the primary post, the movable sheave having a first side positioned to face the fixed sheave and a second side, at least one sheave post extending from the second side of the movable sheave; and
   an activation assembly in operational communication with the movable sheave to move the movable sheave on the primary post away from and towards the fixed sheave based on a centrifugal force experienced by the drive clutch, the activation assembly including,
   a spider with at least one spider arm, the spider generally locked to a rotation of the primary post,
   at least one trunnion slidably mounted on the at least one spider arm, the at least one trunnion having opposable extending trunnion arms,
   a roller rotationally mounted on each trunnion arm, each roller positioned to engage a ramp profile associated with a sheave post of the at least one sheave post of the movable sheave, and
   a main activation biasing member positioned to assert a biasing force on the spider.

2. The drive clutch of claim 1, wherein each roller is selectively mounted on an associated trunnion arm so that the roller can be replaced with at least one of a different sized roller and a different weight roller.

3. The drive clutch of claim 1, further comprising:
   at least one trunnion biasing member positioned to assert a select biasing force on the at least one trunnion.

4. The drive clutch of claim 3, further comprising:
   an adjustable bias force member configured to adjust the biasing force of each trunnion biasing member.

5. The drive clutch of claim 4, wherein each trunnion further comprises:
a trunnion base, the opposable extending trunnion arms extending from the trunnion base, the at least one weight attached to a surface of the trunnion base.

6. The drive clutch of claim 4, wherein each trunnion further comprises:
a trunnion base, the opposable extending trunnion arms extending from the trunnion base, a trunnion attachment post further extending from the trunnion base, the at least one weight mounted on the trunnion attachment post.

7. The drive clutch of claim 1, further comprising:
at least one weight selectively mounted on the at least one trunnion.

8. The drive clutch of claim 1, wherein the ramp profile associated with the sheave post of the at least one sheave post of the movable sheave is interchangeable.

9. The drive clutch of claim 8, further comprising:
at least one fastener to selectively couple the at least one sheave post and associated ramp profile to the movable sheave.

10. The drive clutch of claim 1, wherein the fixed sheave further comprises:
a starter pulley, the starter pulley positioned approximate an outer perimeter of the fixed sheave.

11. The drive clutch of claim 1, further comprising:
a torque dampening assembly coupled between the spider and the primary post, the torque dampening assembly configured to absorb unwanted torque peaks due to motor pulses.

12. The drive clutch of claim 11, wherein the torque dampening assembly further comprises:
a torque dampening member including a plurality of dampening tabs, the dampening tabs made from an elastic material;
a torque transfer member locked to the rotation of the primary post, the torque transfer member including a plurality of torque transfer teeth, the torque damping member and torque transfer member received within a spider passage of the spider such that the plurality of dampening tabs of the torque dampening member are positioned between at least some of the plurality of torque transfer teeth of the torque transfer member and at least some of spaced spider teeth within the spider passage of the spider.

13. A method of calibrating a drive clutch for a continuously variable transmission, the method comprising:
determining desired characteristics of the drive clutch based on an application for a select vehicle; and
changing at least one of a weight of at least one trunnion assembly and a ramp profile to achieve the desired characteristics of the drive clutch, the at least one trunnion assembly including opposably extending trunnion arms, each trunnion arm having mounted thereon a roller configured to engage an associated ramp profile, the at least one trunnion further being slidably mounted on a spider arm of a spider of an activation assembly that is configured to move a movable sheave on a primary post away from and towards a fixed sheave based on a centrifugal force experienced by the drive clutch.

14. The method of claim 13, wherein changing the at least one weight of the at least one trunnion assembly includes at least one of changing the least one roller and adding at least one weight to the trunnion assembly.

15. The method of claim 13, wherein changing the ramp profile includes at least one of changing out at least one sheave post attached to the movable sheave and changing out at least one ramp profile associated with the at least one sheave post.

16. The method of claim 13, further comprising:
applying a select bias force on the at least one trunnion.

17. A vehicle comprising:
a motor to provide motor torque,
a continuously variable transmission including drive clutch, driven clutch and a belt, the drive clutch in operational communication with the motor to receive the motor torque, the belt in operation communication with the drive clutch and the driven clutch to pass torque from the drive clutch to the driven clutch, the drive clutch including,
a primary post configured to receive the motor torque from the motor,
a fixed sheave statically coupled to the primary post;
a movable sheave slidably mounted on the primary post, the movable sheave having a first side positioned to face the fixed sheave and a second side, at least one sheave post extending from the second side of the movable sheave; and
an activation assembly in operational communication with movable sheave to move the movable sheave on the primary post away from and towards the fixed sheave based on a centrifugal force experienced by the drive clutch, the activation assembly including,
a spider with at least one spider arm, the spider generally locked to a rotation of the primary post,
at least one trunnion slidably mounted on the at least one spider arm, the at least one trunnion having opposable extending trunnion arms,
a roller rotationally mounted on each trunnion arm, each roller positioned to engage a ramp profile associated with a sheave post of the at least one sheave post of the movable sheave, and
a main activation biasing member positioned to assert a biasing force on the spider; and
a drive train in operational communicational with the driven clutch.

18. The vehicle of claim 17, the drive clutch further comprising:
at least one trunnion biasing member positioned to assert a select biasing force on at least one trunnion; and
an adjustable bias force member configured to adjust the biasing force on the at least one trunnion.

19. The vehicle of claim 17, the drive clutch further comprising:
a torque dampening assembly coupled between the spider and the primary post, the torque dampening assembly configured to absorb unwanted torque peaks due to motor pulses.

20. The vehicle of claim 17, wherein the fixed sheave of the drive clutch further comprises:
a starter pulley, the starter pulley positioned approximate an outer perimeter of the fixed sheave.

* * * * *